A. BALLOCO.
BRAKE MECHANISM.
APPLICATION FILED APR. 16, 1907.
901,670.
Patented Oct. 20, 1908.
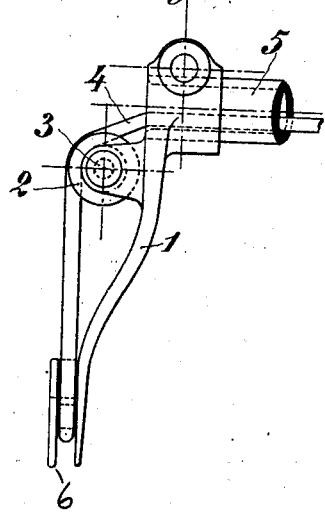
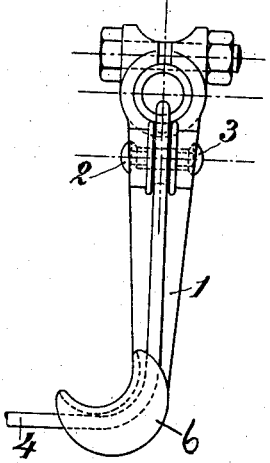
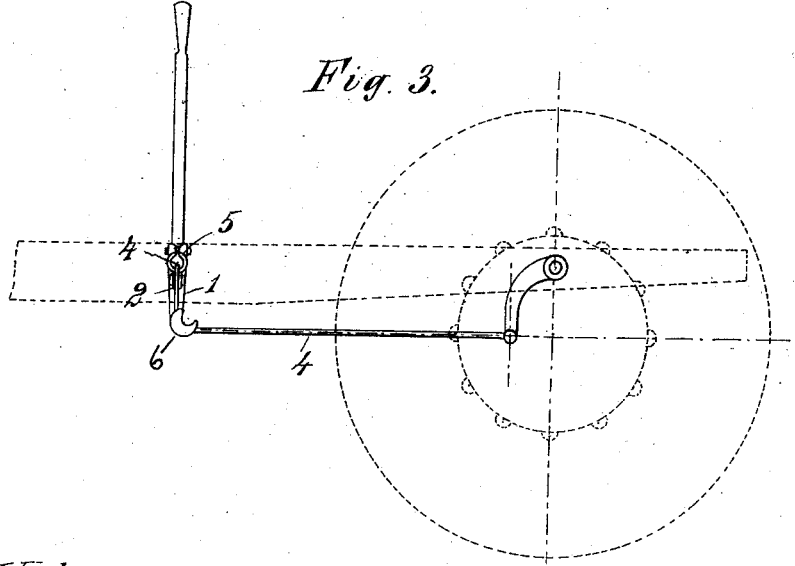
Witnesses.
Inventor
Alberto Balloco
Attorney

UNITED STATES PATENT OFFICE.

ALBERTO BALLOCO, OF TURIN, ITALY, ASSIGNOR TO SOCIETE ANONYME "ITALA" FABRICA DI AUTOMOBILI, OF TURIN, ITALY.

BRAKE MECHANISM.

No. 901,670.      Specification of Letters Patent.      Patented Oct. 20, 1908.

Application filed April 16, 1907. Serial No. 368,557.

*To all whom it may concern:*

Be it known that I, ALBERTO BALLOCO, a subject of the King of Italy, residing in Turin, Italy, have invented certain new and useful Improvements in Brake Mechanisms, of which the following is a specification.

This invention relates to certain improvements in brake mechanism of the character used upon automobiles and the like, and more particularly in that class of such devices wherein the brakes are actuated from a flexible connection, and the object of the invention is to provide a mechanism of this character of a simple and comparatively inexpensive character wherein the operation of the braking means is facilitated and rendered capable of uses with a minimum expenditure of power.

The invention consists in certain novel features and principles of the construction and combinations and arrangements of the several parts of the improved brake mechanism, whereby certain important advantages are attained and the mechanism is rendered simpler, cheaper and otherwise better adapted and more convenient for use all as will be hereinafter fully set forth.

The novel features of the invention will be carefully defined in the claims.

In the accompanying drawings which serve to illustrate the invention—Figure 1 is a side view showing my improvements and Fig. 2 is a view taken at right angles to the direction of vision in Fig. 1, and Fig. 3 is a side elevation showing the brake device provided with my improvements.

As herein illustrated, my improvements are applied to a compensating brake mechanism for the rear wheels of an automobile or like vehicle, wherein a tubular guide member or sleeve 5 is provided which is extended across the vehicle and serves as a conduit through which is passed a flexible connector the opposite ends of which are coupled to the brake members of the respective rear wheels for operative engagement of the brake members in unison with each other. At opposite ends of the guide sleeve or member 5 there are provided levers or arms 1, clamped or otherwise held thereon, so as to be capable of swinging movement in unison with each other when the sleeve or guide member 5 is turned or rocked, and the said levers or arms 1 have at their free ends laterally projecting rounded parts 6, having grooved perimetral surfaces with which are adapted to be engaged the end portion of a flexible connection 4 which may be a wire rope or cable, the central portion of which is passed through the bore of the guide sleeve or member 5, while the end portions thereof are bent, on emerging from said bore and are engaged with the grooved parts 6 and thence carried forward and connected with suitable actuating means in order that the brakes of the rear wheels may be actuated in unison, the said flexible connection affording a compensating connection between the brake mechanism of the respective rear wheels so as to permit of more effective application of the brakes.

In order to lessen wear and friction of the flexible connection at the ends of the sleeve or member 5, I mount grooved sheaves or wheels 2, of small diameter held to turn on pivots 3 extended between spaced lugs upon the outer face of the lever and arranged adjacent to the open ends of the tubular guide sleeve or member, so that the end portions of the flexible connections 4 emerging from the bore of the guide sleeve or member 5 are caused to take over the grooved perimeters of said sheaves or wheels, and are thence extended along the outer faces of the levers to the grooved enlargements 6, the said sheaves or wheels 2 thus operating to lessen the friction and wear which, in the absence of said sheaves or wheels, would be imposed upon the connection where the same emerges from the sleeve or member 5 and is bent to pass the grooved enlargements 6.

From the above description of my improvements it will be apparent that the brake mechanism constructed according to my invention is of an extremely simple and inexpensive nature and is especially well adapted for use by reason of the facility of operation of the brake mechanism and the freedom from friction and wear of the parts afforded by the use of my improvements, and it will also be obvious from the above description that the mechanism is capable of some modification without material departure from the principles and spirit of the invention and for this reason I do not desire to be understood as limiting myself to the precise form and arrangement of the several parts herein set forth in carrying out my invention in practice.

Having thus described my invention, what I claim and desire to secure by Letters Patent is—

1. A brake mechanism of the character described comprising a guide member, an arm adjacent to the end of said member, said arm being capable of swinging movement and having adjacent to its outer end a part adapted for engagement with a flexible connector to guide the same, a grooved sheave carried by said arm adjacent to the end of the guide member, and a flexible connector extended along said guide member and passed around the grooved perimeter of the sheave adjacent to the end of said member, and extended from said sheave along said arm in position for engagement with said part at the outer end of the arm and adapted for connection with a brake device.

2. A brake mechanism of the character described comprising a guide member, an arm adjacent to the end of said member, said arm being capable of swinging movement and having its outer end provided with a laterally directed rounded part the perimetral surface whereof is grooved to receive a flexible connector, a grooved sheave carried by said arm adjacent to the end of the guide member, and a flexible connector extended along said guide member and passed around the grooved perimeter of the sheave adjacent to the end of said member, and extended from said sheave along said arm and passed around the grooved perimetral surface of said laterally projecting part at the outer end of said arm and adapted for connection with a brake device.

3. A brake mechanism of the character described comprising a guide member, an arm adjustably secured upon the end of said member, said arm being capable of swinging movement and having, adjacent to its outer end, a part adapted for engagement with a flexible connector to guide the same, a grooved sheave carried by said arm adjacent to the end of the guide member, and a flexible connector extended along said guide member and passed around the grooved perimeter of the sheave adjacent to the end of said member, and extended from said sheave along said arm in position for engagement with said part at the outer end of the arm and adapted for connection with a brake device.

In witness whereof I have hereunto signed my name this 22d day of March 1907, in the presence of two subscribing witnesses.

ALBERTO BALLOCO.

Witnesses:
SECONDO TORTO,
LOUIS ALLAN.